(12) United States Patent
Bibow

(10) Patent No.: US 8,371,629 B1
(45) Date of Patent: *Feb. 12, 2013

(54) TANK HANDLE AND METHOD OF USING A TANK HANDLE

(75) Inventor: Christopher W. Bibow, Huntington, NY (US)

(73) Assignee: The Christopher W Bibow Irrevocable Trust, Huntington, NY (US)

( * ) Notice: Subject to any disclaimer, the term of this patent is extended or adjusted under 35 U.S.C. 154(b) by 1035 days.

This patent is subject to a terminal disclaimer.

(21) Appl. No.: 12/290,818

(22) Filed: Nov. 4, 2008

(51) Int. Cl.
*B65G 7/12* (2006.01)
*F17C 13/04* (2006.01)

(52) U.S. Cl. ........................ 294/27.1; 297/137
(58) Field of Classification Search .............. 294/2, 26, 294/27.1, 137, 151; 137/355.16, 382, 355; 248/79, 90; 220/724
See application file for complete search history.

(56) References Cited

U.S. PATENT DOCUMENTS

| | | | | |
|---|---|---|---|---|
| 3,958,716 A * | 5/1976 | Korte | | 220/724 |
| 5,186,391 A * | 2/1993 | Roueche et al. | | 239/373 |
| 6,170,518 B1 * | 1/2001 | Ratelle | | 137/376 |
| 6,536,820 B1 * | 3/2003 | Dean et al. | | 294/159 |
| 6,976,490 B2 * | 12/2005 | Joachimsthaler et al. | | 128/204.26 |
| 7,089,956 B1 * | 8/2006 | Davidson et al. | | 137/382 |
| 7,195,031 B2 * | 3/2007 | Trettin et al. | | 137/382 |
| 2003/0098315 A1 * | 5/2003 | Lacy | | 222/1 |
| 2004/0107966 A1 * | 6/2004 | Joachimsthaler et al. | | 128/204.26 |
| 2005/0001440 A1 * | 1/2005 | Hartwell | | 294/137 |

* cited by examiner

*Primary Examiner* — Paul T Chin
(74) *Attorney, Agent, or Firm* — Edward P Dutkiewicz

(57) ABSTRACT

The tank handle has an upper section, a central section, and a lower section, oriented in a common plane and integrally formed. The upper section has an aperture which thereby forms a grip for lifting, and the lower section has an aperture for coupling to a tank gas passageway. The handle is rotatably coupled to the gas passageway of a gas tank.

10 Claims, 2 Drawing Sheets

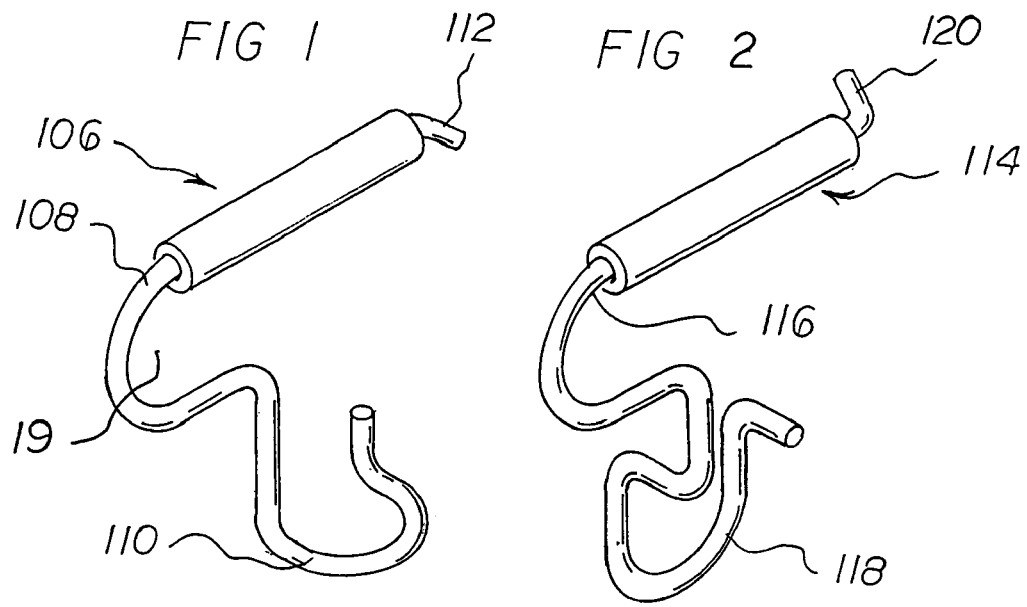
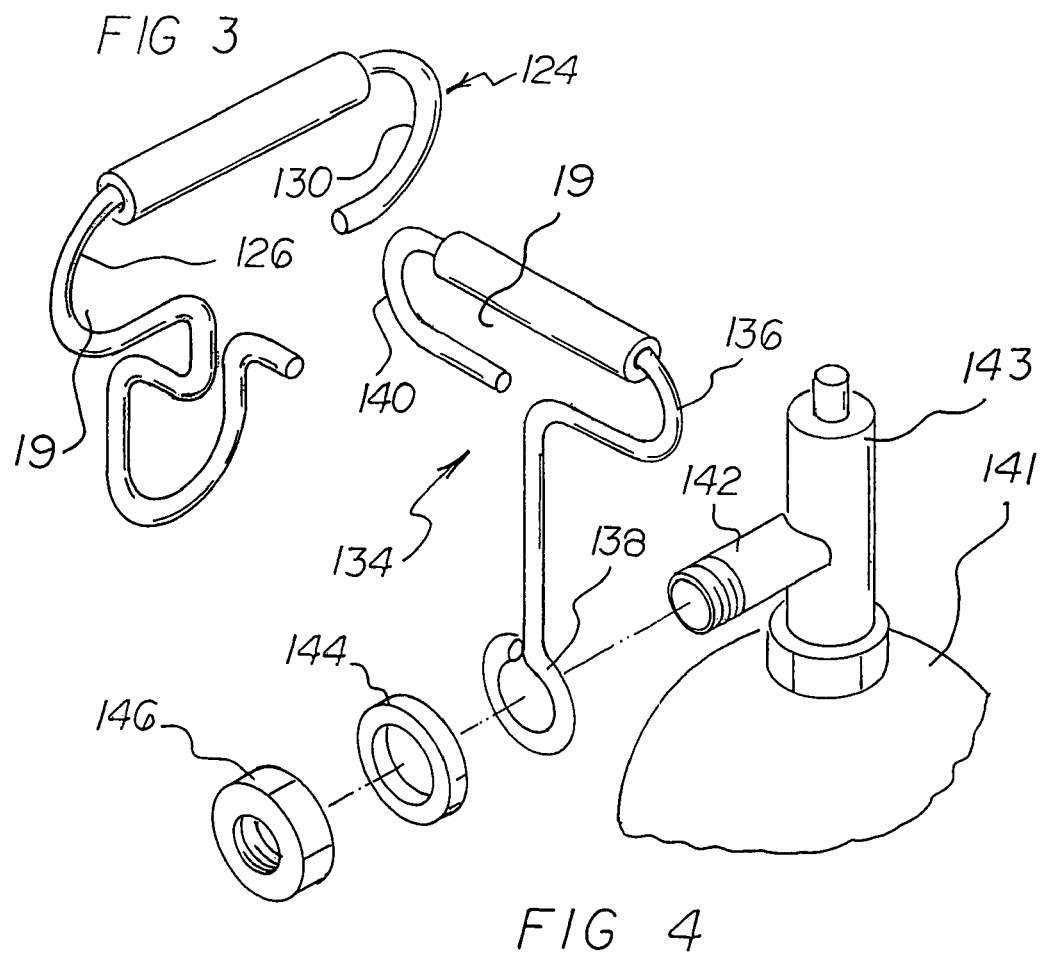

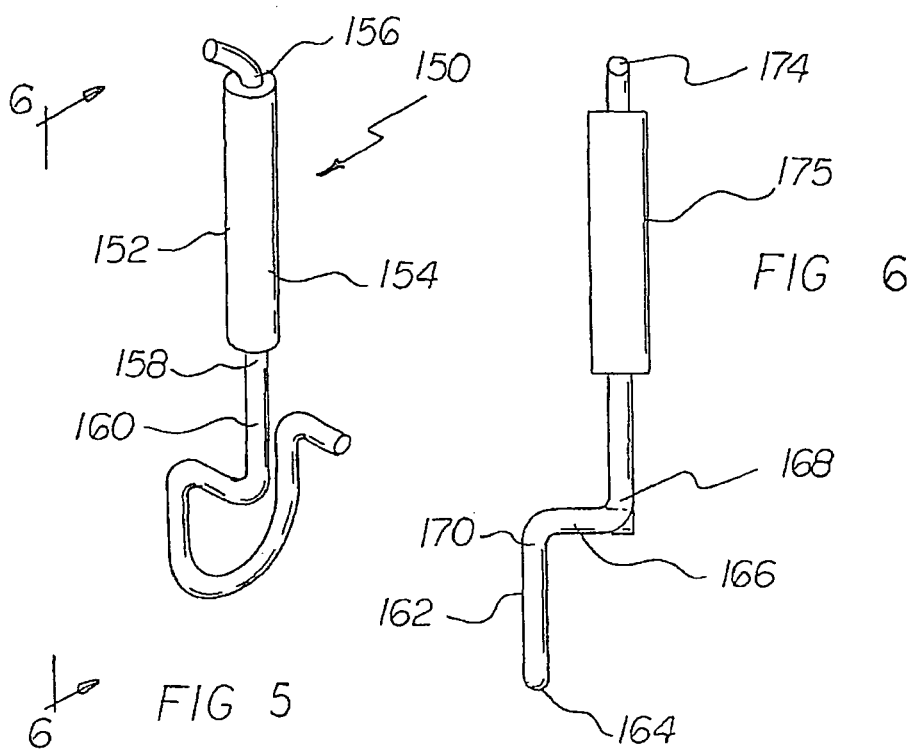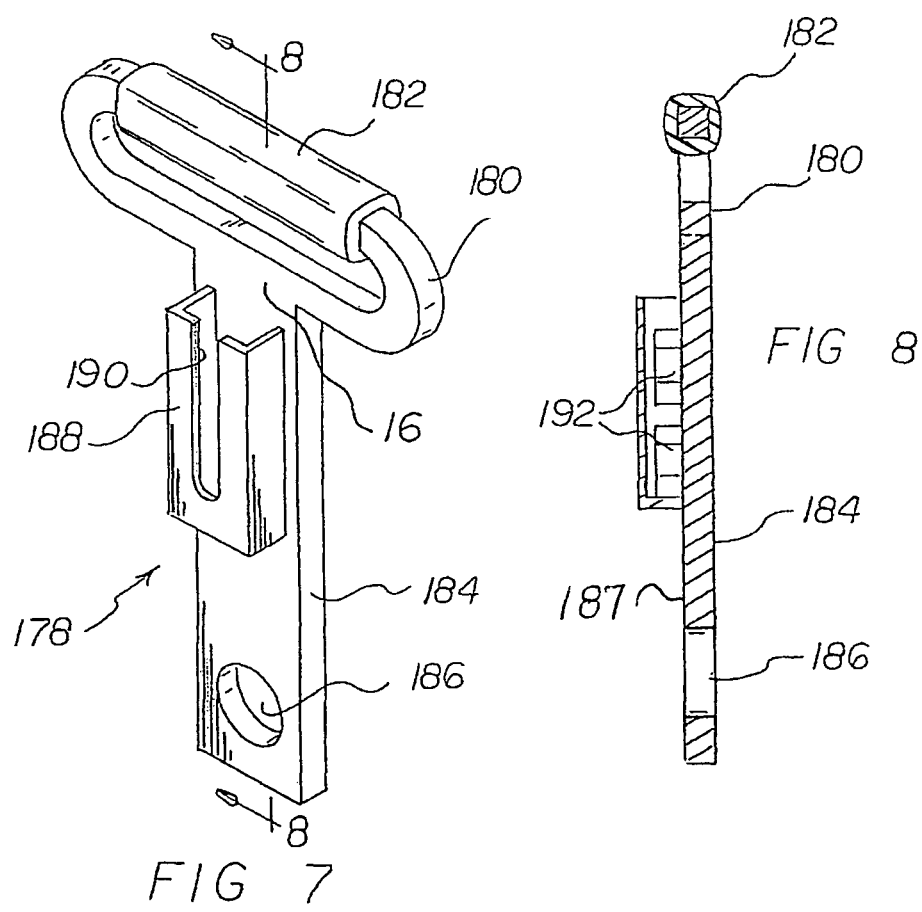

TANK HANDLE AND METHOD OF USING A TANK HANDLE

RELATED PATENT APPLICATIONS

This application is based upon U.S. Provisional Applications 60/553,079 filed Mar. 13, 2004; 60/576,494 filed Jun. 3, 2004; 60/580,980 filed Jun. 17, 2004; 60/584,724 filed Jul. 1, 2004; 60/588,915 filed Jul. 17, 2004; and 60/618,347 filed Oct. 12, 2004, and on U.S. Non-Provisional application, bearing Ser. No. 11/028,368, filed on Jan. 3, 2005, now U.S. Pat. No. 7,588,276.

The Applicant has not submitted a related pending or patented non-provisional application within two months of the filing date of this present application. The invention is made by a single inventor, so there are no other inventors to be disclosed. This application is not under assignment to any other person or entity at this time.

BACKGROUND OF THE INVENTION

1. Field of the Invention

The present invention relates to a tank handle and more particularly pertains to conveniently lifting and transporting a propane tank and a scuba tank and an oxy-acetylene tank and a wide variety of other tanks of the type having a cylindrical neck in a horizontal orientation at an upper region.

2. Description of the Prior Art

The use of container lifters of known designs and configurations is known in the prior art. More specifically, container lifters of known designs and configurations previously devised and utilized for the purpose of lifting containers through known methods and apparatuses are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the aforementioned patents do not describe a tank handle that allows conveniently lifting and transporting a propane tank and a scuba tank and an oxy-acetylene tank and a wide variety of other tanks of the type having a cylindrical neck in a horizontal orientation at an upper region.

In this respect, the tank handle, according to the present invention, substantially departs from the conventional concepts and designs of the prior art, and in doing so provides an apparatus primarily developed for the purpose of conveniently lifting and transporting a propane tank and a scuba tank and an oxy-acetylene tank and a wide variety of other tanks of the type having a cylindrical neck in a horizontal orientation at an upper region.

Therefore, it can be appreciated that there exists a continuing need for a new and improved tank handle which can be used for conveniently lifting and transporting a propane tank and a scuba tank and an oxy-acetylene tank and a wide variety of other tanks of the type having a cylindrical neck in a horizontal orientation at an upper region. In this regard, the present invention, including the various embodiments of the invention as set forth within this disclosure, substantially fulfills this need.

SUMMARY OF THE INVENTION

In view of the foregoing disadvantages inherent in the known types of container lifters of known designs and configurations now present in the prior art, the present invention provides an improved tank handle. As such, the general purpose of the present invention, which will be described subsequently in greater detail, is to provide a new and improved tank handle and method of using a tank handle, which has all the advantages of the prior art and none of the disadvantages.

To attain this, the present invention essentially comprises an upper section. The upper section has a laterally extending horizontal upper portion. The horizontal upper portion is adapted to be held by a user during operation and use. The horizontal upper portion has opposed ends. The upper portion has a length of about seven inches plus or minus ten percent.

Also provided is a lower section. The lower section has a passageway there through. The lower section of the tank handle is configured to receive a cylindrical neck of a tank to be lifted and transported during operation and use. The lower section and the upper section are in a common vertical plane. The lower section passageway has an interior radius of curvature of about 1.250 inches plus or minus ten percent.

Provided last is a central section. The central section forms a linear connector. The linear connector has an upper end formed integrally with the upper section. The linear connector has a lower end formed integrally with the lower section, thereby forming a continuous structure from the upper section to the lower section.

The central section lies in a vertical plane coextensive with the vertical plane of the upper section and the vertical plane of the lower section. The upper, lower and central sections are fabricated of stainless steel, or other equivalent relatively rigid material, preferably metal. The upper, lower and central sections have a circular cross section with a diameter of about 0.125 inches plus or minus 10 percent. The entire system has an overall vertical height during operation ad use of about 7.750 inches plus or minus ten percent.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tank handle which has all of the advantages of the prior art container lifters of known designs and configurations and none of the disadvantages.

It is another object of the present invention to provide a new and improved tank handle which may be easily and efficiently manufactured and marketed.

It is further object of the present invention to provide a new and improved tank handle which is of durable and reliable constructions.

An even further object of the present invention is to provide a new and improved tank handle which is susceptible of a low cost of manufacture with regard to both materials and labor, and which accordingly is then susceptible of low prices of sale to the consuming public, thereby making such tank handle economically available to the buying public.

Even still another object of the present invention is to provide a tank handle for conveniently lifting and transporting a propane tank and a scuba tank and an oxy-acetylene tank and a wide variety of other tanks of the type having a cylindrical neck in a horizontal orientation at an upper region.

Lastly, it is an object of the present invention to provide a new and improved tank handle. An upper section has a generally linear configuration, and is configured with a hand grip, which may be held by a user. The upper section has opposed ends and a downward portion. A lower section is configured with an aperture there through, to receive a cylindrical neck of a tank to be lifted and transported. The lower section and upper section are located in a common plane during operation and use. A central section has is formed to be integral with the upper section and integral with the lower section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the present invention along with a plurality of various alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of an embodiment of the present invention.

FIG. 2 is a perspective view of an embodiment of the present invention

FIG. 3 is a perspective view of an embodiment of the present invention.

FIG. 4 is a perspective view of the embodiment of the present invention. Note the exploded view, showing the handle as it is mounted on the tank gas passageway.

FIG. 5 is a perspective view of another embodiment of the present invention.

FIG. 6 is a view taken along line 6-6 of FIG. 5.

FIG. 7 is a perspective view of the primary embodiment of the present invention.

FIG. 8 is a cross sectional view of the primary embodiment of the present invention. Note that the handle is made of a single material, which is continuous from upper section to lower section. There is provided a hand grip pad.

The same reference numerals refer to the same parts throughout the various Figures of the various embodiments of the invention.

DESCRIPTION OF THE PREFERRED EMBODIMENT

With reference now to the drawings, and in particular to FIGS. 7 and 8 thereof, the preferred embodiment of the new and improved tank handle embodying the principles and concepts of the present invention and generally designated by the reference numeral 10 will be described.

The present invention, the tank handle 10 is comprised of a plurality of components. Such components in their broadest context include an upper section, a lower section and a central section. Such components are individually configured and correlated with respect to each other so as to attain the desired objective.

First provided is an upper section 16. The upper section has a generally linear horizontal upper section grip 18, also called a grip portion of the upper section. The upper section has a first width.

The grip is configured to be held by a user during carrying of the tank to which the tank handle is attached. The grip has an associated resilient member 182 which, at least partially, covers the grip. The resilient member may also wrap around and cover the entire grip portion of the upper section. The grip cover provides for a user's comfort when carrying a tank with the tank handle. The upper section grip may be continuous and fully enclose the grip aperture 19 there through, or the upper section grip may only partially enclose the grip aperture, forming a general slot in association with the grip, as seen in FIGS. 1, 2, 3, and 4. As seen in FIGS. 7 and 8, the grip aperture is fully enclosed by the upper section material, and forms an aperture there through the upper section.

Also provided is a tank handle lower section 184. The lower section has a second width, the first width being greater than the second width. The lower section has an aperture 186 there through. The aperture allows the gas passageway of the tank to pass through the handle. In this manner the handle supports and carries the tank, by providing support to the gas passageway, in the location of the gas passageway coupling. The gas passageway has a third width or diameter. The gas passageway is defined as the path of gas flow between the tank and an outlet of gas into either another container or the atmosphere. Such a configuration would be an oxy-acetylene delivery system, with the gas passageway being defined by the path of gas flow from the tank 141 having a tank valve 143 outlet to a gas delivery hose (not shown, but well known in the art), into which the gas is delivered. The hose, which may or may not include a pressure regulation system (not shown, but well known in the art) couples to the gas passageway 142.

The tank handle lower section second width is greater than the third width, being the outside diameter of the gas passageway. This allows the gas passageway to be contained within the aperture of the handle.

In variations of the embodiment, the first and second widths may be the same, with the tank handle having a generally rectilinear configuration, or the second width may be less than the third width, as shown in FIGS. 1 and 2, where the width of the handle comprises the width of the wire used to make the handle, and may be less than the width of the gas passageway. It should be noted that in this configuration, the width of the lower section is located at least partly around the gas passageway, and at least partially encompasses or contains the gas passageway.

In other embodiments, the lower section aperture is configured so as to form a hook, as shown in FIGS. 1 through 3, in which the hook formed by the aperture forms a substantially open section. In other embodiments, the lower section aperture is defined by a substantially closed off area, as shown in the lower section aperture of FIG. 4.

The tank handle has a central section 44. The central section has a fourth width. In the primary embodiment, the fourth width and second widths are the same, though in other embodiments, the fourth width may be greater or lesser than the second width.

The central section forms a linear connecting portion, and connects the upper section with the lower section. The linear connecting portion has a lower end formed integrally with the lower section.

The upper, lower and central sections are fabricated of stainless steel, or other equivalent relatively rigid material, preferably metal. The upper, lower and central sections have a generally planar configuration and lie in a common plane, though in other embodiments the upper, lower and central sections may be offset, and lie in planes that are parallel to each other. In still other embodiments the upper, lower and central sections have a circular cross section with a diameter of between about 0.125 inch and 1 inch. In these configurations the tank handle is made of a rigid bent continuous wire.

The entire tank handle has an overall vertical height during operation ad use of about 7.750 inches plus or minus ten percent.

The embodiment shown in FIGS. 1, 2, and 3 are perspective illustrations of an additional embodiment of the invention with a generally circular cross section. The embodiment 106 of FIG. 1 has the vertical plane of the upper section 108 at 90 degrees from the plane of the lower section 110 which is horizontal. A downward portion connects the upper and lower sections, and lies in a vertical plane. The embodiment 114 of FIG. 2 has the vertical plane of the upper section 116 parallel with, but offset from, the plane of the lower section 118 which is vertical. This configuration places the weight of the tank beneath the general center of the handle, making the carrying of the tank balanced and comfortable.

A grip retainer 120 is in a horizontal plane. The grip retainer functions to contain the grip 121 on the handle. The embodiment 124 of FIG. 3 has the vertical plane of the upper section 126 parallel with, but offset from, the plane of the lower section 128, which is vertical. The grip retainer 130 is in a vertical plane.

In FIG. 4, the embodiment 134 has the vertical plane of the upper section 136 in the plane of the lower section 138 which is vertical. The shortened downward portion 140 is in the same vertical plane. In addition, the lower section formed as a circle adapted to receive a horizontal gas passageway 142 of a tank and held in place by a washer 144 and nut 146.

In this embodiment, the handle may be coupled to the gas passageway by the placement of the handle on the gas passageway, on one side of the union, or coupling of the gas passageway with a gas delivery system, such as a regulator, valve, or hose (not shown).

An additional alternate embodiment of the invention is illustrated in FIGS. 5 and 6. In this embodiment, the tank handle 150 comprises a grip 152 with a generally linear and tubular configuration to be held by a user. The grip is configured to be held vertically or essentially vertically during operation and use. The grip has opposed ends 156, 158 and a downward portion 160 extending from one end of the grip, the lower end 158. The grip and the downward portion are in a common essentially vertical plane during operation and use. The system also comprises a lower section 162 with a lower portion 164 configured to receive a horizontally disposed cylindrical section of a neck of a tank to be lifted and transported. The lower portion is in a generally vertical plane during operation and use.

Lastly, the tank handle of this embodiment comprises a generally horizontally disposed central section 166 with a connecting portion having an upper end 168 formed integral with the upper section and a lower end 170 formed integral with the lower section. In order to provide greater comfort to a user of the system, a resilient grip 172 in a cylindrical configuration is slipped over the upper portion of the upper section. The upper end 156 of the upper portion is then formed with a bend 174 to retain the grip in a proper position. The preferred material for the grip is polyurethane foam.

In the embodiments of the present invention, the upper, lower, and central sections are fabricated of a single, relatively rigid, continuous, material. The relatively rigid material has a preferable thickness of between about 0.125 inch and 0.5 inch plus or minus 10 percent. Added features, such as the resilient grip or nut holder may be made of any type of material suited for the purpose. The added features may be made of the same material as are the sections of the handle, or the added features may be made of different materials.

The embodiment 178 of FIGS. 7 and 8 has an upper section 180 which is generally oval with a hand grip 182. The lower section 184 is linear with an aperture 186 for receiving a gas passageway of the tank to be held. The upper section is oriented in a vertical plane. The upper section and the lower section each lie in a common plane and form a generally linear configuration. This embodiment may further include a box-like extension 188 on the lower portion beneath the upper portion and above the aperture. The box-like extension has an open top and a vertical slot 190 for the receipt of nuts 192 adapted to be used with tank to be held. In this embodiment the gas passageway passes through the aperture in the lower section of the tank handle. The handle encloses at least part of the gas passageway. The planar configuration allows for rotation of the handle around the tank gas passageway, so that the handle may be rotated up for carrying, and then may be rotated down, along side the tank for storage. As most, if not all, gas cylinders use a common means of coupling the gas passageway to the regulator or hose, it is understood that the gas passageway may have a union assembly (not shown) which may be removed, or disassembled, to allow the placement of the handle on the gas passageway. The union is then re-assembled, so that the connection of the tank to a regulator or hose may be then made. As such, the handle lifts the tank near the valve, and close to the center of gravity, as would be expected. The coupling of the handle to the gas passageway is the coupling of the handle to a strong, durable portion of the gas flow system.

The upper section aperture and lower section aperture are oriented generally parallel with each other, and both the upper section aperture and lower section aperture are oriented to be generally perpendicular to the common plane of the upper section and lower section of the tank handle. The orientation of the apertures allows the tank gas passageway to be coupled to the tank handle so as to allow the weight of the tank to be generally normal to the aperture periphery 189.

The tank handle is made of a solid, continuous material. The outer surfaces of the handle, as can be seen in FIGS. 1 through 8, are generally smooth. The general exception is that the nut holder, as shown in FIGS. 7 and 8, as reference item 188, protrudes from the surface of the tank handle. As can be seen in FIG. 8, the lowermost end of the lower section is solid, with a smooth lowermost surface 187. The upper hand grip aperture, and the lower section gas passageway aperture are aligned in a common plane, and are generally parallel to each other. As can be seen in FIG. 7, and can be noted in all the drawings, the gas passageway is, at least, partially enclosed within the aperture of the lower section. FIGS. 1 through 6 demonstrate the lower section aperture partially enclosing and encasing the gas passageway. FIGS. 7 and 8 demonstrate a lower section aperture that fully encircles, and confines at least a part of the gas passageway, meaning that a section, or part of, the periphery of the gas passageway is fully enclosed within the lower section aperture.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tank handle for lifting and transporting a tank having a gas passageway in a generally horizontal orientation, the tank handle comprising, in combination:
   an upper section with an aperture there through, the aperture thereby forming a grip to be held by a user during operation and use with the upper section having a length;
   a lower section of the tank handle having a width, the width of the lower section having a gas passageway aperture there through, the gas passageway aperture having an interior radius of curvature;
   a central section having a connecting portion having an upper end formed integral with the upper section of the tank handle and a lower end formed integral with the lower section of the tank handle; and
   the radius of curvature of the gas passageway aperture being about 1.250 inches plus or minus ten percent.

2. The tank handle as described in claim 1 with the central section being in a vertical plane coextensive with the upper section and the lower section, the upper and lower and central sections being fabricated of stainless steel; and
   the upper portion is generally oval with a hand grip.

3. The tank handle as described in claim 1 with the upper section and lower section lying in a common plane, with the upper section aperture and the lower section gas passageway aperture being generally parallel with each other, with the upper section aperture and lower section aperture also being oriented perpendicular to the common plane of the upper section and lower section of the handle.

4. The tank handle as described in claim 3 wherein the upper and lower sections are made of a single material, and the upper section and lower section are continuous with each other.

5. The tank handle as set forth in claim 1 wherein the tank handle is rotatably coupled to the tank gas passageway.

6. The tank handle as described in claim 1 wherein the upper section aperture forms a generally oval configuration.

7. The tank handle as described in claim 1 wherein the upper portion is generally oval with a hand grip and the lower portion is linear with an aperture, the central section having a nut holder, the nut holder having an open top and a vertical slot for the receipt of nuts to be used with tank to be held.

8. The tank handle as described in claim 7 wherein the tank handle is fixedly coupled to the gas passageway.

9. The tank handle as described in claim 1 wherein the upper section has a first width and the lower section have a second width, the first width being greater than the second width.

10. A tank handle comprising:
    an upper section with a generally linear portion configured to be supported by a user, the upper section being oriented in a vertical plane, the upper section with an aperture there through, the aperture thereby forming a grip to be held by a user during operation and use with the upper section having a length;
    a lower section with a portion configured to receive a gas passageway of a tank to be lifted and transported, the lower section being oriented in the vertical plane of the upper section, the upper section and lower section being in a common plane, the lower section having a gas passageway aperture there through; and
    a central section being integrally formed with the upper section and the lower section thereby continually connecting the upper and lower section, the central section being oriented in the common plane thereby forming a generally linear configuration.

\* \* \* \* \*

UNITED STATES PATENT AND TRADEMARK OFFICE
CERTIFICATE OF CORRECTION

| | | |
|---|---|---|
| PATENT NO. | : 8,371,629 B1 | Page 1 of 1 |
| APPLICATION NO. | : 12/290818 | |
| DATED | : February 12, 2013 | |
| INVENTOR(S) | : Christopher W. Bibow | |

It is certified that error appears in the above-identified patent and that said Letters Patent is hereby corrected as shown below:

Specification

Column 1
Please insert the words -- a continuation in part -- into line 5, column 1, between "This application is" and "based upon U.S. Provisional..."

Signed and Sealed this
Ninth Day of February, 2016

Michelle K. Lee
*Director of the United States Patent and Trademark Office*